United States Patent
Verhoeven et al.

(10) Patent No.: US 9,420,912 B2
(45) Date of Patent: Aug. 23, 2016

(54) BEVERAGE-PREPARATION DEVICE PROVIDED WITH A LIQUID DISTRIBUTOR

(75) Inventors: Ramon Eduard Verhoeven, Heerhugowaard (NL); Carlos Nicolaas Jozef Maria Koopman, Heerhugowaard (NL); Johannes Theodorus Emerentia Huiberts, Spanbroek (NL)

(73) Assignee: BRAVILOR HOLDING B.V., Heerhugowaard (NL)

( * ) Notice: Subject to any disclaimer, the term of this patent is extended or adjusted under 35 U.S.C. 154(b) by 0 days.

(21) Appl. No.: 13/516,994

(22) PCT Filed: Dec. 15, 2010

(86) PCT No.: PCT/NL2010/050852
§ 371 (c)(1),
(2), (4) Date: Jul. 13, 2012

(87) PCT Pub. No.: WO2011/074958
PCT Pub. Date: Jun. 23, 2011

(65) Prior Publication Data
US 2012/0285329 A1    Nov. 15, 2012

(30) Foreign Application Priority Data
Dec. 18, 2009  (NL) ...................................... 2003977

(51) Int. Cl.
*A47J 31/40*  (2006.01)
*B67D 1/00*  (2006.01)
(Continued)

(52) U.S. Cl.
CPC .............. *A47J 31/401* (2013.01); *A47J 31/007* (2013.01); *A47J 31/46* (2013.01); *A47J 31/402* (2013.01)

(58) Field of Classification Search
CPC ................................... A47J 31/00; A47J 31/46
USPC .................... 99/291, 300, 306, 307, 304, 275; 141/103, 104
See application file for complete search history.

(56) References Cited

U.S. PATENT DOCUMENTS 3,586,214 A * 6/1971 Diebel ........................ 222/129.4
4,143,793 A * 3/1979 McMillin et al. ................. 222/1
(Continued)

FOREIGN PATENT DOCUMENTS

EP    1719439 A1    11/2006
FR    2542598 A1     9/1984
(Continued)

OTHER PUBLICATIONS

International Searching Authority, International Search Report, Apr. 14, 2011, 4 pages.

*Primary Examiner* — David Angwin
*Assistant Examiner* — Lawrence Samuels
(74) *Attorney, Agent, or Firm* — Tucker Ellis LLP

(57) ABSTRACT

The present invention relates to a beverage-preparation device (1, 40) provided with a storage container (2) for liquid, a dispensing (4, 43) line connected to the storage container (2), at least two beverage-dispensing stations (6, 7, 9) each provided with a collecting reservoir (11, 12, 18, 41, 42), which collecting reservoirs are movable with respect to the dispensing line, a driving device (5, 21, 22) which engages with the dispensing line and/or the collecting reservoirs for displacing the dispensing line with respect to the collecting reservoirs in order to selectively bring the collecting reservoirs into liquid communication with the dispensing line and a control unit for controlling the driving device, characterized in that, within a dispensing period Td, the control unit brings the dispensing line into liquid communication with a first collecting reservoir in order to dispense a predetermined amount of liquid to each collecting reservoir, then with a second collecting reservoir and after that again with the first reservoir.

5 Claims, 3 Drawing Sheets

Figure 1:
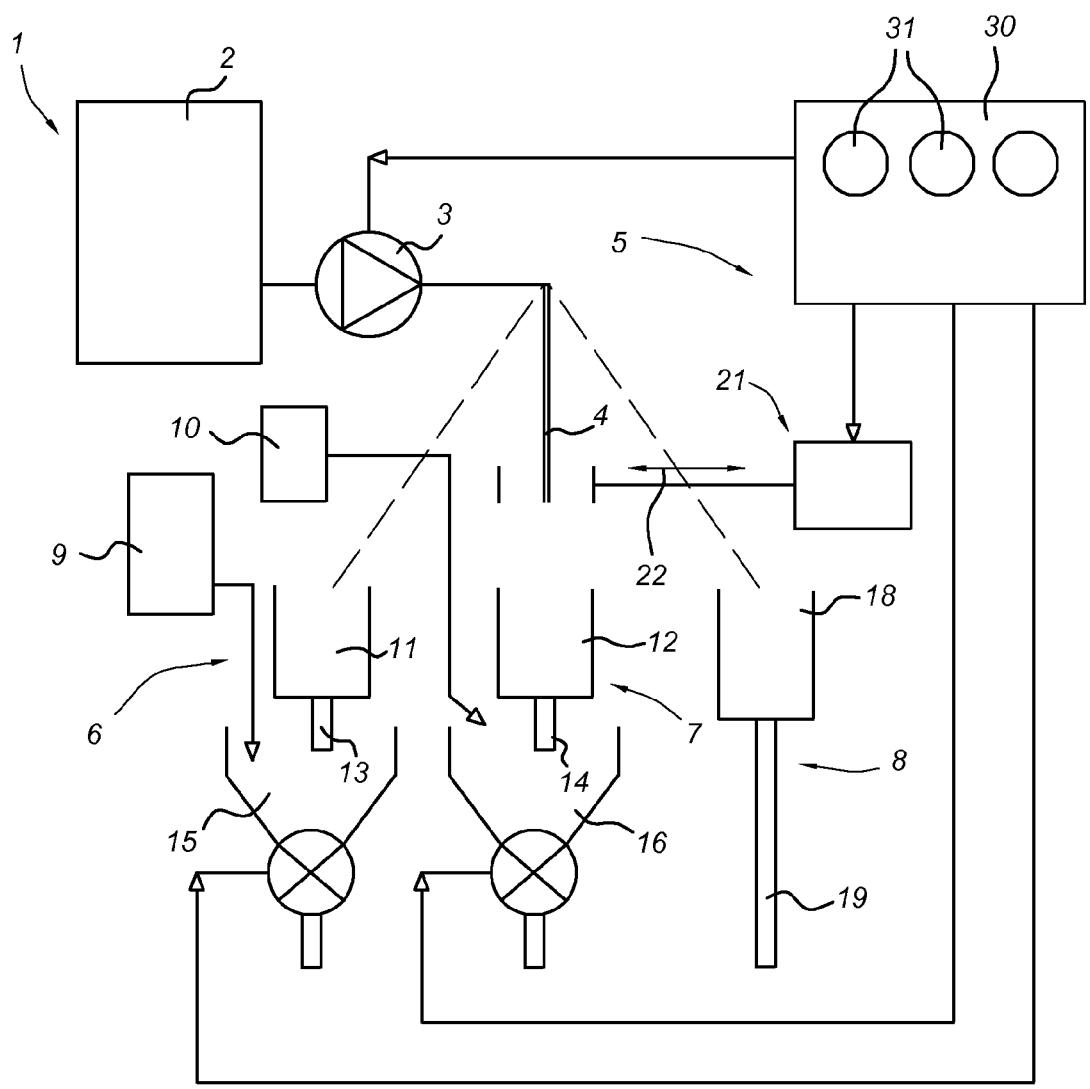

(51) Int. Cl.
*A47J 31/00* (2006.01)
*A47J 31/46* (2006.01)

(56) References Cited

U.S. PATENT DOCUMENTS

| | | | |
|---|---|---|---|
| 4,938,387 A * | 7/1990 | Kervefors et al. | 222/129.4 |
| 5,158,793 A * | 10/1992 | Helbling | 426/231 |
| 5,803,320 A * | 9/1998 | Cutting et al. | 222/641 |
| 6,640,847 B2 * | 11/2003 | Verhoeven | 141/98 |
| 7,147,131 B2 * | 12/2006 | Sher et al. | 222/1 |
| 7,507,430 B2 * | 3/2009 | Stearns et al. | 426/474 |
| 8,322,570 B2 * | 12/2012 | Beavis et al. | 222/52 |
| 2005/0061156 A1 * | 3/2005 | Hart et al. | 99/275 |
| 2006/0249030 A1 * | 11/2006 | Bienvenu et al. | 99/291 |
| 2007/0068969 A1 * | 3/2007 | Orzech et al. | 222/214 |
| 2008/0277019 A1 * | 11/2008 | Somerby | 141/9 |
| 2009/0159612 A1 * | 6/2009 | Beavis et al. | 222/52 |
| 2010/0154644 A1 * | 6/2010 | Skalski et al. | 99/275 |
| 2010/0154892 A1 * | 6/2010 | Skalski | A47J 31/0668 137/13 |

FOREIGN PATENT DOCUMENTS

| | | | |
|---|---|---|---|
| WO | 0141094 A1 | 6/2001 | |
| WO | WO 2009036911 A1 * | 3/2009 | B67D 1/00 |

* cited by examiner

Fig 6a
Fig 6b
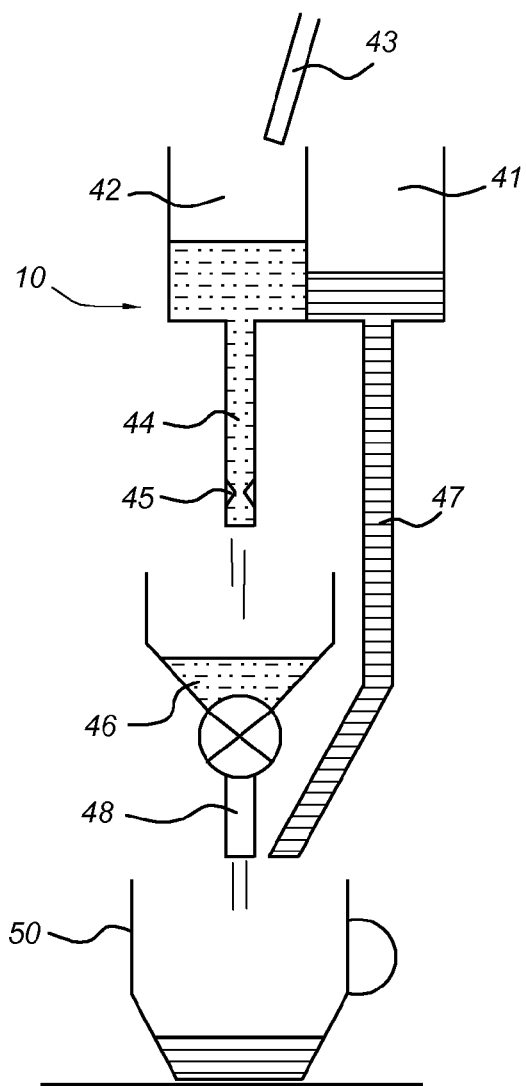
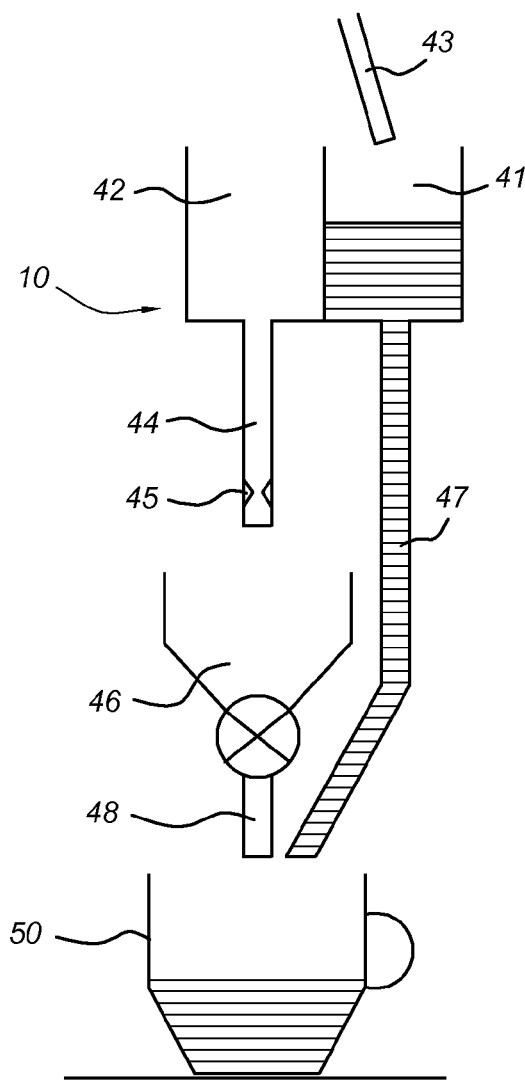

BEVERAGE-PREPARATION DEVICE PROVIDED WITH A LIQUID DISTRIBUTOR

The invention relates to a beverage-preparation device provided with a storage container for liquid, a dispensing line connected to the storage container, at least two beverage-dispensing stations each provided with a collecting reservoir, which collecting reservoirs are movable with respect to the dispensing line, a driving device which engages with the dispensing line and/or the collecting reservoirs for displacing the dispensing line with respect to the collecting reservoirs in order to selectively bring the collecting reservoirs into liquid communication with the dispensing line and a control unit for controlling the driving device.

A beverage-preparation device of this type is known from Dutch patent number NL 1013769 in the name of the Applicant. This publication describes a device having a number of collecting reservoirs, each of which is connected to a user, such as a dispensing station, via a flexible line, and which can be placed under an outlet line of a hot water reservoir. The collecting reservoirs are displaceable by means of a rocking suspension. The flexible lines connected to the collecting reservoirs debouch either directly into a beverage-dispensing area, for example for dispensing hot water to a cup or beaker for making tea, or debouch into a mixing device. Material, such as powder, is supplied to this mixing device, which material is mixed with the supplied liquid in order to prepare a beverage (for example coffee, soup or fruit juice) which is then dispensed to a user.

EP 0 151 500 discloses a device for dispensing liquid from a tank to a number of users, provided with a flexible dispensing line which can be displaced by the driving device above a number of collecting reservoirs. In this way, the use of valves can be omitted, which, in cases where hot water is dispensed, results in reliable operation and a reduction in maintenance.

The known devices have the drawback that the collecting reservoirs corresponding to the various users are filled successively and that simultaneous use is not possible. It is therefore an object of the invention to provide a beverage-preparation device which is suitable for simultaneously dispensing liquid to at least two users in a simple and reliable manner.

To this end, a beverage-dispensing device according to the invention is characterized in that, within a dispensing period Td, the control unit brings the dispensing line into liquid communication with a first reservoir in order to dispense a predetermined amount of liquid to each collecting reservoir, then with a second reservoir and after that again with the first reservoir.

By alternately filling the two collecting reservoirs, each of them is successively filled with a part of the total amount of liquid to be dispensed by that reservoir within the dispensing period. After the first reservoir has been filled with a first amount of liquid, the second reservoir is filled, after which a second amount of liquid is supplied to the first reservoir. As a result thereof, liquid can be dispensed simultaneously from both reservoirs to several users by means of a relatively simple device. By choosing the relatively high frequency of switching the liquid supply to the collecting reservoirs, both reservoirs are filled steadily and liquid is dispensed to a user virtually simultaneously from both collecting reservoirs. By varying the diameter of the dispensing line above each reservoir, the amounts of liquid dispensed to various users can be adjusted in a simple manner.

A user to which liquid is dispensed from the collecting reservoirs may be:

- a beverage-preparation device for preparing a beverage from (instant) ingredients and cold, warm or hot water. Such a device is for example described in more detail in NL 2000164.
- a receptacle such as a cup, beaker or jug for directly dispensing hot water, for example for preparing a beverage outside the dispensing device, such as tea by means of a tea bag, or soup from a bag, etc. It is also possible to supply hot water to the same receptacle (e.g. cup or beaker) as the one to which beverage has been supplied by the mixing device in order to dilute it.

It is possible that the first collecting reservoir becomes empty during the time the second collecting reservoir is being filled, thus resulting in a pulsed dispensing of water from the reservoirs. However, certain applications require a virtually constant supply of water from the collecting reservoir. This is the case, in particular, if the water is mixed with an ingredient in order to produce a beverage, such as powder for producing instant coffee. In these cases, in an embodiment of a beverage-preparation device, at least one collecting reservoir is provided with an outlet line having a diameter such that, in a period Ti between two successive filling positions for said reservoir, the reservoir does not become empty.

In an embodiment of a beverage-preparation device, a closure member is provided between the storage container (for example a hot water reservoir) and the dispensing line, which closure member is controlled by the control unit and is closed when a relative displacement takes place between the dispensing line and the collecting reservoirs. This makes it possible to use collecting reservoirs which are not situated next to one another and to achieve accurate metering of liquid to the various users. The closure member may comprise a pump or a valve.

In a further embodiment of a beverage-preparation device, a pump is provided upstream of the dispensing line, which pump is connected to the control unit, wherein an input is supplied to the control unit of a number of collecting reservoirs to be filled, after which the pump is activated by the control unit in order to dispense the amount of liquid to the collecting reservoirs which corresponds to the input. As a result thereof, the total amount of liquid to be dispensed from the reservoir can be adapted to the number of users. A beverage-preparation device provided with a pump which is suitable for application of the invention is described in NL 2001559.

Furthermore, provision may be made, according to the invention, for the outlet line of a first collecting reservoir to debouch into a mixing device for mixing the base material for producing a beverage using the liquid, an outlet of which mixing device debouches into a dispensing area, wherein the outlet line of the second collecting reservoir debouches into the dispensing area. By mixing a limited amount of liquid using a first collecting reservoir having, for example, a relatively small capacity in order to produce a concentrated beverage, and adding liquid via a second collecting reservoir, separate from the mixing operation, in order to dilute the beverage to a strength such that it is suitable for consumption, the waiting time for the consumer for this process is not increased. In addition, even with a mixing device having a limited capacity, the device according to the invention can produce a larger amount of beverage more quickly.

Figure 2:
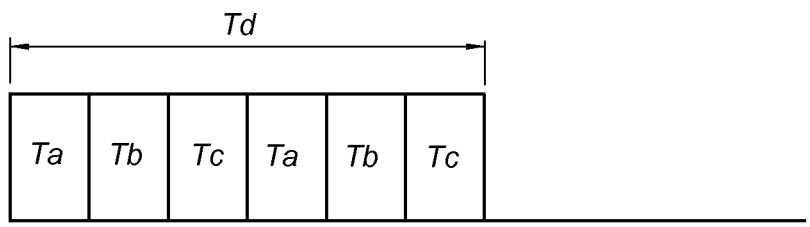
Figure 3:
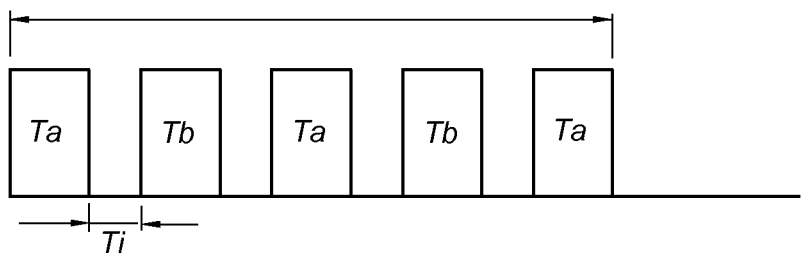
Figure 4:
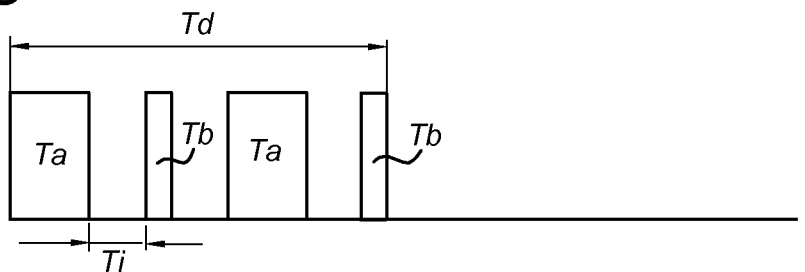
Figure 5:
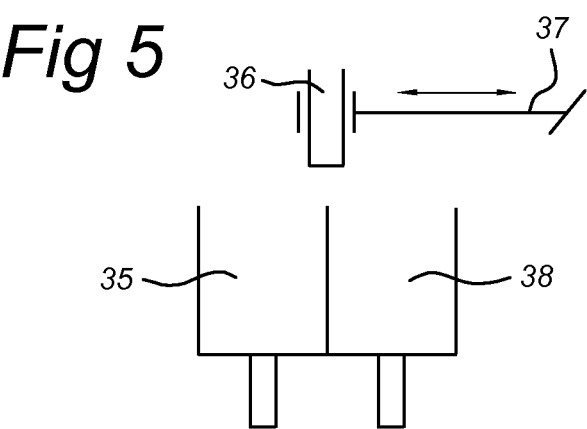

Some embodiments of a beverage-preparation device according to the invention will now be explained in more detail with reference to the attached drawing, in which:

FIG. 1 shows a diagrammatic illustration of a beverage-preparation device according to the invention, FIG. 2 shows the time period the movable dispensing line remains above adjoining collecting reservoirs within a filling period Td, FIG. 3 shows the time period the movable dispensing line remains above spaced-apart collecting reservoirs, when the water supply is interrupted, FIG. 4 shows the various time periods the dispensing line remains above the collecting reservoirs, FIG. 5 shows a diagrammatic illustration of two collecting reservoirs arranged next to one another, and FIGS. 6a and 6b show a device according to the invention for preparing a beverage by dilution.

FIG. 1 shows a beverage-preparation device 1 with a hot water reservoir 2, a pump 3 and a dispensing line 4. The dispensing line 4 is connected to a driving device 5 for displacing the dispensing line with respect to beverage-dispensing stations 6,7 and 8. Each of the beverage-dispensing stations 6,7 comprises a container 9, 10 for powder, a collecting reservoir 11,12 for liquid from the dispensing line 4, and a mixing device 15,16 into which the containers 9,10 and the collecting reservoirs, each via an outlet line 13, 14, debouch. A third beverage-dispensing station 8 is only provided with a collecting reservoir 18 and an outlet line 19 for dispensing hot water.

The dispensing line 4 is displaceable via a driving device 5 with drive member 21 and can be brought into liquid communication with each collecting reservoir 11,12,18. The dispensing line 4 may be flexible, as is described, for example, in EP 0 151 500, in which case it is possible for the drive member 21 to comprise an arm 22 which can be displaced to and fro. The pump 3, the drive member 21 and the dispensing stations 6,7 are controlled by a control unit 30 which has a number of buttons 31 via which an operator can select two or more beverage-dispensing stations 6,7, 8 for dispensing of a beverage to these stations.

The control unit 30 moves the dispensing line 4 to and fro between the delivery positions which debouch above the selected collecting reservoirs 11,12 and 18. Within a dispensing period Td, the dispensing line 4 in this case remains above the collecting reservoirs 15,16 and 18 several times, successively during a period Ta, Tb, Tc. As a result thereof, liquid is simultaneously dispensed to the mixing devices 15, 16 and to the outlet line 19 within the dispensing period Td. Via the latter, hot water can be dispensed to a jug or cup, while a beverage is dispensed from the stations 6 and 7, after powder from the containers 9, 10 has been mixed in.

If the collecting reservoirs 11, 12 and 18 are spaced apart, as is illustrated in FIG. 1, the control unit 30 switches off the pump 3 when the dispensing line 4 is displaced from one receptacle to the next. If the collecting reservoirs are placed against one another without any gaps, the dispensing line can be moved without interrupting the pump action of the pump 3.

If the delivery of liquid from the collecting reservoirs has to be continuous, for example in order to produce a good mixture with the powder from the containers 9, 10, the control unit 30 moves the dispensing line 4 at such a frequency that this reservoir is not completely emptied between the moment the dispensing line is moved from a collecting reservoir and the moment it returns. Depending on the number of beverage-dispensing stations 6,7,8 selected, the control unit determines the flow rate and the operating period of the pump 3, as well as the frequency of displacement of the dispensing line 4.

If pulsed dispensing of beverages from the collecting reservoirs 11,12,18 is acceptable, the frequency of displacement of the dispensing line can be lowered by the control unit 30.

Instead of a pump 3, a controllable valve can also be used, in which case liquid is supplied from the water reservoir 2 on account of the force of gravity. Furthermore, it is possible to use a stationary line, instead of a dispensing line 4 which moves with respect to stationary collecting reservoirs 11,12, 18, with the reservoirs being moved under the line 4, while these reservoirs are connected, in this case via flexible outlet lines 13,14 and 19, to mixing devices 15,16 or a fixed dispensing position at the end of outlet line 19.

FIG. 2 shows the time period Ta,Tb,Tc which the dispensing line remains above each collecting reservoir within the dispensing period Td for three collecting reservoirs a, b,c. In this case, the collecting reservoirs abut one another (see for example the embodiment from FIG. 5) so that the liquid flow from the dispensing line is uninterrupted. In this case, Ta,Tb, Tc is, for example, 1 s at a flow rate of the dispensing line 4 of 45 ml/s, and the dispensing period Td is, for example, 6 s, so that the dispensing line is positioned above each collecting reservoir twice.

As is illustrated in FIG. 3, the dispensing line can be placed between two collecting reservoirs a,b which are such a distance apart that dispensing is interrupted for a displacement period Ti of the dispensing line. In this case, Ti is, for example, 0.55. In the illustrated case, the reservoir a is filled three times in succession and the reservoir b is filled twice during identical periods Ta, Tb.

FIG. 4 shows that the dispensing periods Ta and Tb for the collecting reservoirs a, b can differ from one another, depending on the size or the residence time of the liquid in the respective reservoirs a,b.

In the embodiment from FIG. 5, two collecting reservoirs 35,36 abut one another and the dispensing line 38 can be moved to and fro above the reservoirs 35,36 by the arm 37 without interruption of the liquid flow.

Although the invention has been described with reference to a dispensing line 4 which moves to and fro, it is also possible to use a rotating distributor, as described in NL2001560 in the name of the Applicant, instead. This publication describes a distributor having at least two discharge ducts which are at the same distance from a central axis and run parallel thereto, and a supply duct and a distributor member which is rotatable about the axis and has a supply end situated along the axis and a dispensing line which is situated at a radial distance therefrom. By rotating the distributor member, the dispensing line can selectively be brought into fluid communication with the respective delivery ducts. The distributor member comprises a U-shaped connecting duct, the supply end of which is placed rotatably in line with the supply duct and the delivery end of which can be placed in fluid communication with the respective delivery ducts. As a result of the rotary movement of the distributor, the time required to displace the dispensing line to the various collecting reservoirs is equal, so that a simple control of the rotational drive suffices.

FIGS. 6a and 6b show the operation of a beverage-preparation device 40 comprising two collecting reservoirs 41,42 and a movable dispensing line 43. The reservoir 42 debouches into a mixing device 46 via an outlet line 44. A restriction 45 in the outlet line 44 adapts the liquid flow through the line to the amount of liquid supplied by the dispensing line 43 during a dispensing period, and ensures that the reservoir 42 does not become empty and that the dispensing of liquid by the line 44 is continuous. This results in an ideal mixture with a powder and from this a beverage is prepared in the mixing device 46, and dispensed to the container 50 via outlet 48.

From the collecting reservoir 41, liquid is directly supplied to a container 50 via the outlet line 47, even at the point in time before the beverage prepared in the mixing device 46 is supplied. As is shown in FIG. 6b, the beverage is dispensed from the mixing device after a certain preparation time, during which complete mixing is effected. After this operation has finished, the collecting reservoir 41 is emptied in order to dispense such an amount of liquid that the concentrated beverage which has been dispensed from the mixing device 46 is diluted sufficiently and is suitable for consumption.

By allowing a user to input a desired strength via the control unit 30, the time the dispensing line 43 remains above the liquid reservoir 41 is set, and the total amount of diluting liquid which is dispensed from reservoir 41 is adjusted. Since a relatively small amount of concentrated liquid is dispensed via the mixing device 46, and by simultaneously supplying diluting liquid directly from the reservoir 41 to the container 50, it is possible, even with a small capacity of the mixing device 46, to prepare a relatively large amount of beverage without increasing the waiting time. In this way, it is possible to modify an existing beverage-preparation device with a mixing device having a relatively small capacity in such a manner that the capacity of the preparation device increases.

The invention claimed is:

1. A beverage-preparation device adapted to provide a beverage to a container, comprising:
a storage reservoir adapted to store liquid;
a dispensing line connected to the storage reservoir;
a first collecting reservoir provided with a first outlet line;
a mixer connected with the first outlet line;
a second collecting reservoir provided with a second outlet line;
wherein the first and second outlet lines are arranged so that liquid dispensed from the first and second outlet lines is providable to the container; and
wherein the dispensing line is repositionable to selectively bring the dispensing line into liquid communication with one of the first and second collecting reservoirs; and the beverage-preparation device further comprising:
a control unit (30) for controlling the positioning of the dispensing line; and
wherein the control unit is configured to control the positioning of the dispensing line such that within a dispensing period of a single serving, the dispensing line is firstly brought into liquid communication with the first collecting reservoir in order to supply a first predetermined amount of liquid to said first collecting reservoir, secondly brought into liquid communication with the second collecting reservoir in order to supply a second predetermined amount of liquid to said second collecting reservoir such that the complete single serving is dispensed into the container while providing an uninterrupted flow of the liquid to the container.

2. The beverage-preparation device of claim 1, wherein within the dispensing period of a single serving the dispensing line is thirdly brought into liquid communication with the first collecting reservoir; and wherein the first outlet line has a diameter such that, in a period between two successive filling positions for said reservoir, the reservoir does not become empty.

3. The beverage-preparation device of claim 1, further comprising a closure member provided between the storage reservoir and the dispensing line, which closure member is controlled by the control unit and is closed when a relative displacement takes place between the dispensing line and the first and second collecting reservoirs.

4. The beverage-preparation device of claim 1, further comprising a pump provided between the storage reservoir and the dispensing line, which pump is connected to the control unit, wherein an input can be supplied to the control unit which is indicative of an amount of liquid to be dispensed, after which the pump is activated by the control unit in order to dispense the amount of liquid to the first and second collecting reservoirs which corresponds to the input.

5. The beverage-preparation device of claim 1, wherein the mixer is configured to mix a base material for producing the beverage using the liquid.

* * * * *